US012668955B2

(12) United States Patent (10) Patent No.: US 12,668,955 B2

Yokoo et al. (45) Date of Patent: Jun. 30, 2026

(54) DISPLAY SYSTEM AND DISPLAY METHOD FOR WORK MACHINE

(71) Applicant: KOMATSU LTD., Tokyo (JP)

(72) Inventors: Takashi Yokoo, Tokyo (JP); Yuki Shimano, Tokyo (JP); Yousuke Uchida, Tokyo (JP)

(73) Assignee: KOMATSU LTD., Tokyo (JP)

( * ) Notice: Subject to any disclaimer, the term of this patent is extended or adjusted under 35 U.S.C. 154(b) by 175 days.

(21) Appl. No.: 18/574,179

(22) PCT Filed: Oct. 3, 2022

(86) PCT No.: PCT/JP2022/036895

§ 371 (c)(1),
(2) Date: Dec. 26, 2023

(87) PCT Pub. No.: WO2023/063131

PCT Pub. Date: Apr. 20, 2023

(65) Prior Publication Data

US 2024/0240438 A1 Jul. 18, 2024

(30) Foreign Application Priority Data

Oct. 15, 2021 (JP) .................................. 2021-169385

(51) Int. Cl.
*E02F 9/26* (2006.01)
*E02F 9/20* (2006.01)
*G06T 3/40* (2024.01)

(52) U.S. Cl.
CPC ............ *E02F 9/265* (2013.01); *E02F 9/2025* (2013.01); *E02F 9/261* (2013.01); *G06T 3/40* (2013.01)

(58) Field of Classification Search
CPC . E02F 9/26; E02F 9/264; E02F 9/2025; E02F 9/2045; E02F 5/145; E02F 3/16;

(Continued)

(56) References Cited

U.S. PATENT DOCUMENTS 5,065,326 A * 11/1991 Sahm ...................... E02F 3/437
701/50
6,211,856 B1 * 4/2001 Choi ...................... H03J 1/0025
345/173

(Continued)

FOREIGN PATENT DOCUMENTS

JP 2001-098585 A 4/2001
JP 2004-107925 A 4/2004

(Continued)

OTHER PUBLICATIONS

Manager, Excavator Offset Boom—The Definitive FAQ Guide, Jul. 26, 2021, Xugong, https://excavatorhydraulic.com/excavator-offset-boom/ (Year: 2021).*

(Continued)

*Primary Examiner* — Ramya P Burgess
*Assistant Examiner* — Sara J Lewandroski
(74) *Attorney, Agent, or Firm* — Spencer Fane LLP

(57) ABSTRACT

A display system includes a display and a controller. The controller acquires machine position data indicative of a position of a work machine. The controller acquires a separation distance in a width direction of the revolving body between a work point of the work implement and a revolving axis. The work point is spaced from the revolving axis in the width direction. The controller acquires target position data indicative of a target position of the work implement. The controller causes the display to display a guideline indicative of the target position and a guide image indicative of the position of the work machine based on the machine position data and the target position data. The guide image includes a first image and a second image. The first image indicates a position of the revolving axis. The second image indicates a position away from the revolving axis by the separation distance.

17 Claims, 17 Drawing Sheets

(58) Field of Classification Search
CPC ..... E02F 3/26; E02F 3/43; E02F 3/631; E02F 3/84; E02F 3/907; E02F 3/145; G01C 21/367; G01C 2219/23163; G01C 2219/31475; G01C 2219/35334; G06F 2203/04806; G06F 2203/04808; G09G 2340/045
See application file for complete search history.

(56) References Cited

U.S. PATENT DOCUMENTS

| | | | | |
|---|---|---|---|---|
| 8,812,198 B1 * | 8/2014 | Liu | ....................... | E02F 9/2045 |
| | | | | 701/50 |
| 2005/0027420 A1 | 2/2005 | Fujishima et al. | | |
| 2012/0267128 A1 * | 10/2012 | Shintani | .................... | E02F 9/26 |
| | | | | 172/1 |
| 2013/0222573 A1 * | 8/2013 | Onuma | ..................... | E02F 9/24 |
| | | | | 348/82 |
| 2014/0007021 A1 * | 1/2014 | Akiyama | ............ | G06F 3/04883 |
| | | | | 715/863 |
| 2014/0099178 A1 * | 4/2014 | Nomura | .................... | E02F 9/26 |
| | | | | 414/685 |
| 2017/0016211 A1 * | 1/2017 | Arimatsu | ................ | G01S 19/14 |
| 2017/0305018 A1 * | 10/2017 | Machida | ................ | B25J 9/1674 |
| 2019/0024347 A1 * | 1/2019 | Izumikawa | ............ | E02F 9/264 |
| 2021/0010241 A1 | 1/2021 | Nishi | | |
| 2021/0230841 A1 | 7/2021 | Kurosawa | | |
| 2021/0388578 A1 * | 12/2021 | Saito | ...................... | B60Q 9/008 |
| 2022/0018096 A1 * | 1/2022 | Nishi | ................... | G06N 3/0464 |

FOREIGN PATENT DOCUMENTS

| | | |
|---|---|---|
| JP | 2004-107926 A | 4/2004 |
| JP | 2020-159192 A | 10/2020 |
| JP | 2020-183615 A | 11/2020 |
| JP | 2021-056816 A | 4/2021 |
| JP | 2019-244574 A1 | 6/2021 |
| WO | 2017/010563 A1 | 1/2017 |
| WO | 2019/189935 A1 | 10/2019 |
| WO | 2020/080538 A1 | 4/2020 |

OTHER PUBLICATIONS

The International Search Report for the corresponding international application No. PCT/JP2022/036895, issued on Nov. 22, 2022.

* cited by examiner 41          42

41          42

41          42

41          42

DISPLAY SYSTEM AND DISPLAY METHOD FOR WORK MACHINE

CROSS-REFERENCE TO RELATED APPLICATIONS

This application is a U.S. National stage application of International Application No. PCT/JP2022/036895, filed on Oct. 3, 2022. This U.S. National stage application claims priority under 35 U.S.C. § 119(a) to Japanese Patent Application No. 2021-169385, filed in Japan on Oct. 15, 2021, the entire contents of which are hereby incorporated herein by reference.

BACKGROUND

Technical Field

The present disclosure relates to a display system and a display method for a work machine.

Background Information

A display system for assisting the positioning of a work implement of a work machine and a target position is disclosed, for example, in International Publication No. WO 2017/010563. In the display system of International Publication No. WO 2017/010563, the work machine is a hydraulic excavator that includes a revolving body and a work implement. The target position is the center line of a trench formed on the ground surface. The display system causes a guide display for positioning the work implement of the hydraulic excavator and the center line of the trench on a display. The guide display includes a centering guideline and an indication mark.

The centering guideline represents the position of the center line of the trench. The indication mark represents the position of the revolving axis of the revolving body and the position of the work point of the work implement. The work point is, for example, the position of the center of the blade tip of the work implement. The operator refers to the guide display and causes the hydraulic excavator to travel so that the indication mark of the revolving axis matches the centering guideline. Consequently, the center line of the trench and the revolving axis of the hydraulic excavator match. The operator then rotates the revolving body so that the indication mark of the work point matches a position on the centering guideline. Consequently, the work implement is positioned on the center line of the trench.

SUMMARY

In the above display system, the revolving axis is positioned on a working plane that extends through the work point of the work implement in the front-back direction of the work implement. As a result, the hydraulic excavator is operated so as to position the indication mark of the revolving axis and the indication mark of the work point on the centering guideline, whereby the work implement is positioned accurately so that the working plane is positioned on the center line of the trench.

However, the work point may be disposed away from the revolving axis in the width direction of the revolving body in a work machine. In this case, even if the work machine is operated so that the revolving axis and the work point are positioned on the center line of the trench, the working plane is not parallel to the center line of the trench. As a result, there is a need to perform an operation for further positioning in consideration of the deviation between the position of the work point and the position of the revolving axis, and such an operation is complicated. An object of the present disclosure is to facilitate an operation for positioning the work implement of the work machine and the target position.

One aspect of the present disclosure is a display system for a work machine. The work machine includes an undercarriage, a revolving body, and a work implement. The revolving body is supported on the undercarriage so as to allow revolving about a revolving axis. The work implement is connected to the revolving body. The display system includes a display and a controller. The controller is communicably connected to the display. The controller acquires machine position data that indicates the position of the work machine. The controller acquires a separation distance in a width direction of the revolving body between a work point of the work implement and the revolving axis. The work point is disposed away from the revolving axis in the width direction. The controller acquires target position data that indicates a target position of the work implement. The controller causes the display to display, on a guide screen, a guideline that indicates the target position and a guide image that indicates the position of the work machine, based on the machine position data and the target position data. The guide image includes a first image and a second image. The first image indicates the position of the revolving axis. The second image indicates a position spaced away from the revolving axis by the separation distance.

Another aspect of the present disclosure is a display method for a work machine. The work machine includes an undercarriage, a revolving body, and a work implement. The revolving body is supported on the undercarriage in a manner that allows rotating about a revolving axis. The work implement is connected to the revolving body. The display method includes: acquiring machine position data that indicates the position of the work machine; acquiring a separation distance in the width direction between a work point of the work implement disposed away from the revolving axis in the width direction of the revolving body, and the revolving axis; acquiring target position data that indicates a target position of the work implement; and displaying, on a display, a guide screen that includes a guideline that indicates a target position and a guide image that indicates the position of the work machine, based on the machine position data and the target position data. The guide image includes a first image and a second image. The first image indicates the position of the revolving axis. The second image indicates a position away from the revolving axis by the separation distance.

According to the present disclosure, an operator of the work machine refers to the first image and the second image on the display and is able to easily discern the positional relationship between the working plane passing through the work point and the revolving axis. As a result, an operation for positioning the work implement and the target position is facilitated even in a work machine in which the work point is disposed away from the revolving axis in the width direction of the revolving body.

DESCRIPTION OF EMBODIMENTS

Figure 1:
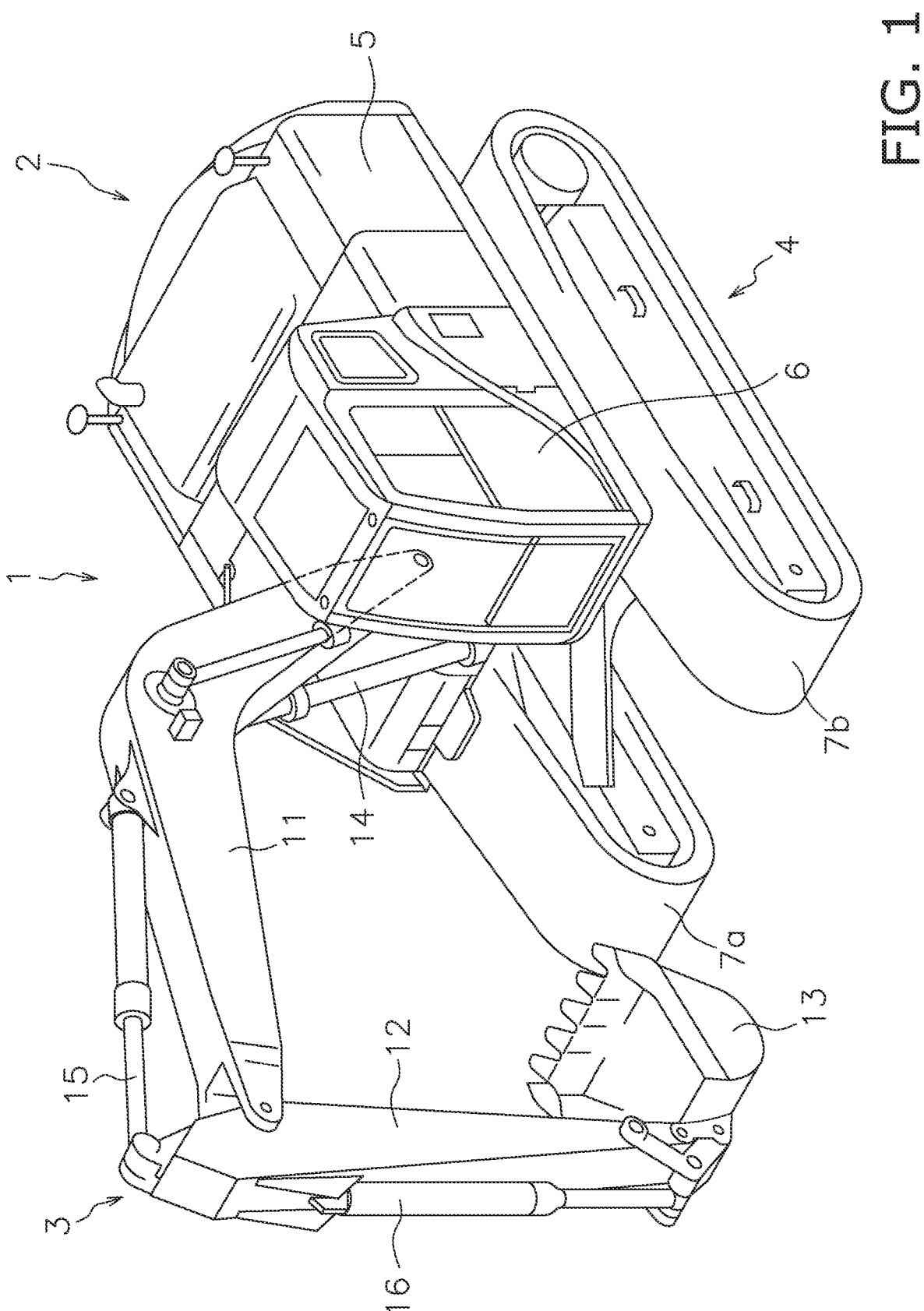
FIG. 1 is a perspective view of a work machine according to an embodiment.
Figure 2:
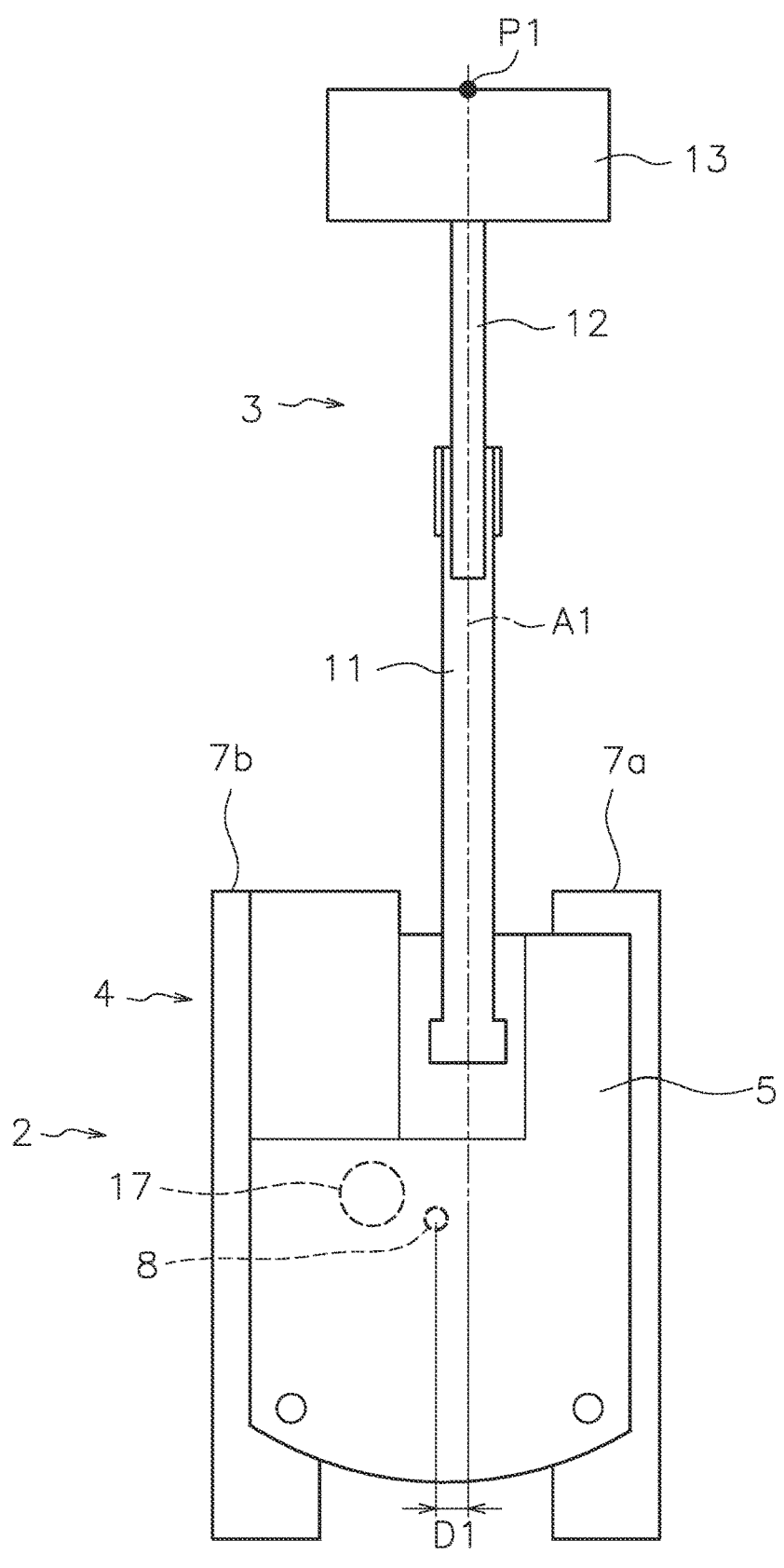
FIG. 2 is top view of the work machine.

The following is a description of a work machine according to an embodiment with reference to the drawings. FIG. 1 is a perspective view of a work machine 1 according to the embodiment. FIG. 2 is a top view of the work machine 1. The work vehicle 1 is a hydraulic excavator in the present embodiment. The work vehicle 1 includes a machine body 2 and a work implement 3. The machine body 2 has an undercarriage 4 and a revolving body 5.

The revolving body 5 is supported by the undercarriage 4. As illustrated in FIG. 2, the revolving body 5 is supported by the undercarriage 4 in a manner that enables rotation about a revolving axis 8. The revolving axis 8 extends in the up-down direction of the work machine 1. An operating cabin 6 is disposed on the revolving body 5. The undercarriage 4 causes the work machine 1 to travel. The undercarriage 4 includes crawler belts 7a and 7b. The work machine

1 travels due to the rotation of the crawler belts 7a and 7b. The undercarriage 4 may also include tires instead of the crawler belts 7a and 7b.

A work implement 3 is attached to the revolving body 5. The work implement 3 extends forward from the revolving body 5. The work implement 3 has a boom 11, an arm 12, and a work tool 13. The boom 11 is rotatably attached to the revolving body 5. The arm 12 is rotatably attached to the boom 11. The work tool 13 is rotatably attached to the arm 12.

The work implement 3 includes a plurality of actuators 14-16. The work implement 3 operates by means of the actuators 14-16. The actuators 14-16 are, for example, hydraulic cylinders. The work implement 3 operates due to the extension and contraction of the actuators 14-16. As illustrated in FIG. 2, the work machine 1 includes a revolving motor 17. The revolving motor 17 causes the revolving body 5 to revolve with respect to the undercarriage 4. The revolving motor 17 is, for example, a hydraulic motor. Alternatively, the revolving motor 17 may be an electric motor.

In the following explanation, the front-back direction of the work implement 3 and the front-back direction of the revolving body 5 signify the direction that the work implement 3 extends as seen from above the work machine 1. The direction where the work implement 3 is disposed with respect to the revolving body 5 is forward and the opposite direction is rearward. The width direction of the revolving body 5 signifies the direction perpendicular to the front-back direction of the revolving body 5 in a horizontal plane. The front-back direction of the undercarriage 4 signifies the advancing direction of the undercarriage 4. The front-back direction of the work machine 1 signifies the front-back direction of the undercarriage 4.

Figure 3:
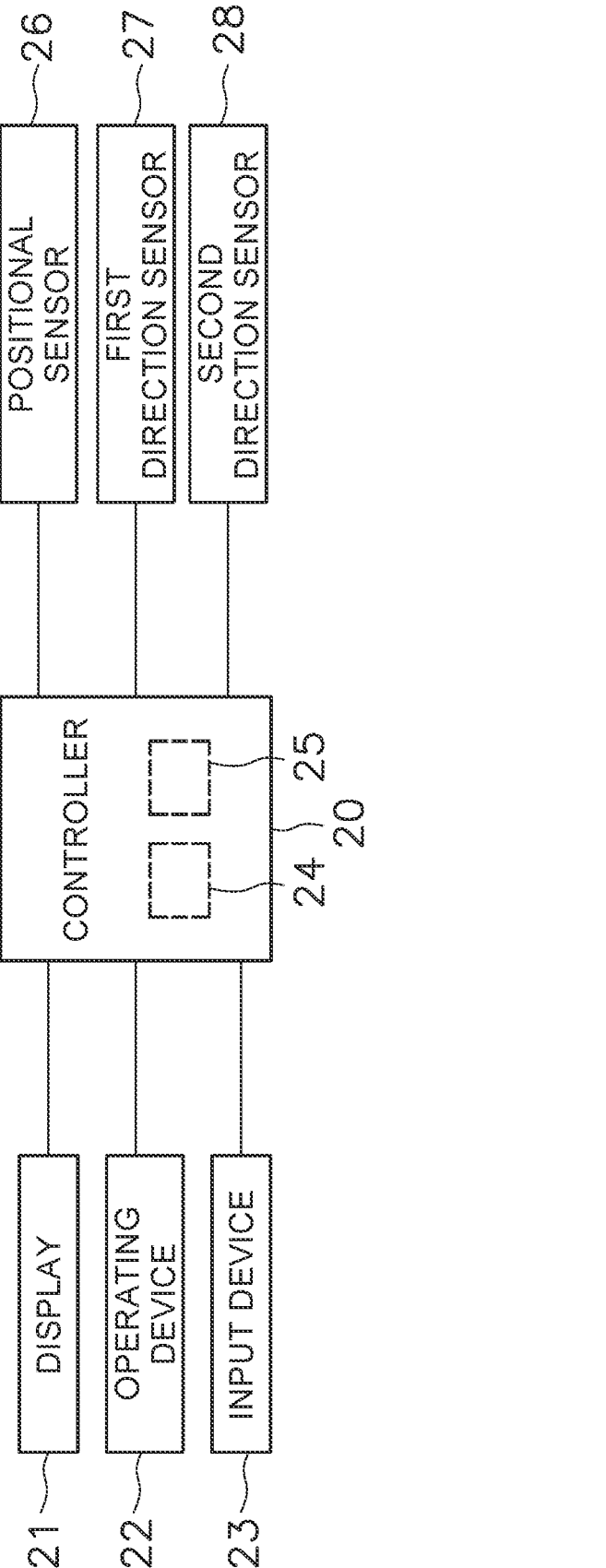
FIG. 3 is a block diagram of a control system of the work machine.

Next, a control system of the work machine 1 will be explained. FIG. 3 is a block diagram of a configuration of a control system of the work machine 1. As illustrated in FIG. 3, the work machine 1 includes a controller 20, a display 21, an operating device 22, and an input device 23. The display 21 displays images corresponding to image signals received from the controller 20.

The operating device 22 is operable by an operator. The operator actuates the work implement 3 and operates the revolving of the revolving body 5 and the traveling of the undercarriage 4 with the operating device 22. The operating device 22 includes, for example, a lever, a pedal, or a switch. The operating device 22 outputs, to the controller 20, an operation signal corresponding to an operation by the operator.

The input device 23 is operable by the operator. The operator inputs a setting for controlling the work machine 1 with the input device 23. The input device 23 is, for example, a touchscreen integrated with the display 21. Alternatively, the input device 23 may include a switch, a keyboard, or a pointing device. The input device 23 outputs, to the controller 20, an operation signal corresponding to an operation by the operator.

The controller 20 is communicably connected to the display 21, the operating device 22, and the input device 23. The controller 20 includes a processor 24 and a storage device 25. The processor 24 is for example, a central processing unit (CPU) but may also be another type of processor.

The storage device 25 includes a memory, such as a random access memory (RAM) and a read-only memory (ROM). The storage device 25 may also include a storage, such as a hard disk drive (HDD) or a solid state drive (SSD).

The storage device 25 is an example of a non-transitory computer-readable recording medium. The storage device 25 stores programs and data for controlling the work machine 1. The processor 24 executes processing for controlling the work machine 1 in accordance with a program and data.

The controller 20 controls the actuators 14-16 and actuates the work implement 3 in accordance with the operation signals from the operating device 22. For example, the controller 20 actuates the work implement 3 so that the work tool 13 rises or lowers in accordance with the operation signals from the operating device 22 and the input device 23. The controller 20 controls the revolving motor 17 and causes the revolving body 5 to revolve in accordance with the operation signals from the operating device 22. The controller 20 causes the crawler belts 7a and 7b to rotate in accordance with the operation signals from the operating device 22, whereby the work machine 1 travels.

The work machine 1 includes a positional sensor 26, a first direction sensor 27, and a second direction sensor 28. The positional sensor 36 detects the position of the work machine 1. The positional sensor 26 outputs machine position data that indicates the position of the work machine 1. The positional sensor 26 is, for example, a global navigation satellite system (GNSS) sensor such as a global positioning system (GPS). Specifically, the positional sensor 26 is disposed on the machine body 2. The machine position data indicates the position of the machine body 2. The position of the machine body 2 is the position of a reference point included on the machine body 2.

The controller 20 receives the machine position data. The controller 20 acquires the position of the machine body 2 from the machine position data. The controller 20 acquires the position of the revolving axis 8 from the machine position data. For example, the controller 20 calculates the position of the revolving axis 8 from the position of the reference point of the machine body 2. Alternatively, the controller 20 may directly acquire the position of the revolving axis 8 from a sensor for detecting the position of the revolving axis 8.

The controller 20 also acquires the position of a work point P1 of the work implement 3 from the machine position data. As illustrated in FIG. 2, the work point P1 is a position on the work tool 13. For example, when the work tool 13 is a bucket, the work point P1 is positioned in the center in the width direction at the blade tip of the bucket. The controller 20 acquires the position of the work point P1 from the machine position data. For example, the controller 20 calculates the position of the work point P1 from the position of the reference point of the machine body 2. Alternatively, the controller 20 may directly acquire the position of the work point P1 from a sensor for detecting the position of the work point P1.

As illustrated in FIG. 2, in the work machine 1 according to the present embodiment, a working plane A1 is disposed away from the revolving axis 8 in the width direction of the revolving body 5. The working plane A1 is a plane that is parallel to the revolving axis 8, passes through the work point P1, and extends in the front-back direction of the work implement 3. The controller 20 stores the distance between the working plane A1 and the revolving axis 8 in the width direction of the revolving body 5, as a separation distance D1 of the work point P1. The separation distance D1 may be saved beforehand in the storage device 25 of the controller 20. The controller 26 may also acquire the separation distance D1 through an operation of the input device 23 by the operator. The controller 20 may also acquire the separation distance D1 from an external computer.

The first direction sensor 27 detects the direction of the revolving body 5. The first direction sensor 27 outputs first directional data that indicates the direction of the revolving body 5. The direction of the revolving body 5 is the direction that the front of the revolving body 5 is facing. The first directional data is, for example, indicated by an angle with respect to a reference direction such as magnetic north. The first direction sensor 27 may also be, for example, a GNSS sensor, an IMU, or a combination thereof.

The second direction sensor 28 detects the direction of the undercarriage 4. The second direction sensor 28 outputs second directional data that indicates the direction of the undercarriage 4. The direction of the undercarriage 4 is the direction that the front of the undercarriage 4 is facing. The second directional data is, for example, indicated by an angle with respect to a reference direction such as magnetic north. The second direction sensor 28 may also be, for example, a GNSS sensor, an IMU, or a combination thereof.

One of the first direction sensor 27 and the second direction sensor 28 may be a sensor that detects the revolving angle of the revolving body 5 with respect to the undercarriage 4. In such a case, the direction of the undercarriage 4 may be calculated from the direction and revolving angle of the revolving body 5. Alternatively, the direction of the revolving body 5 may be calculated from the direction and revolving angle of the undercarriage 4.

Figure 4:
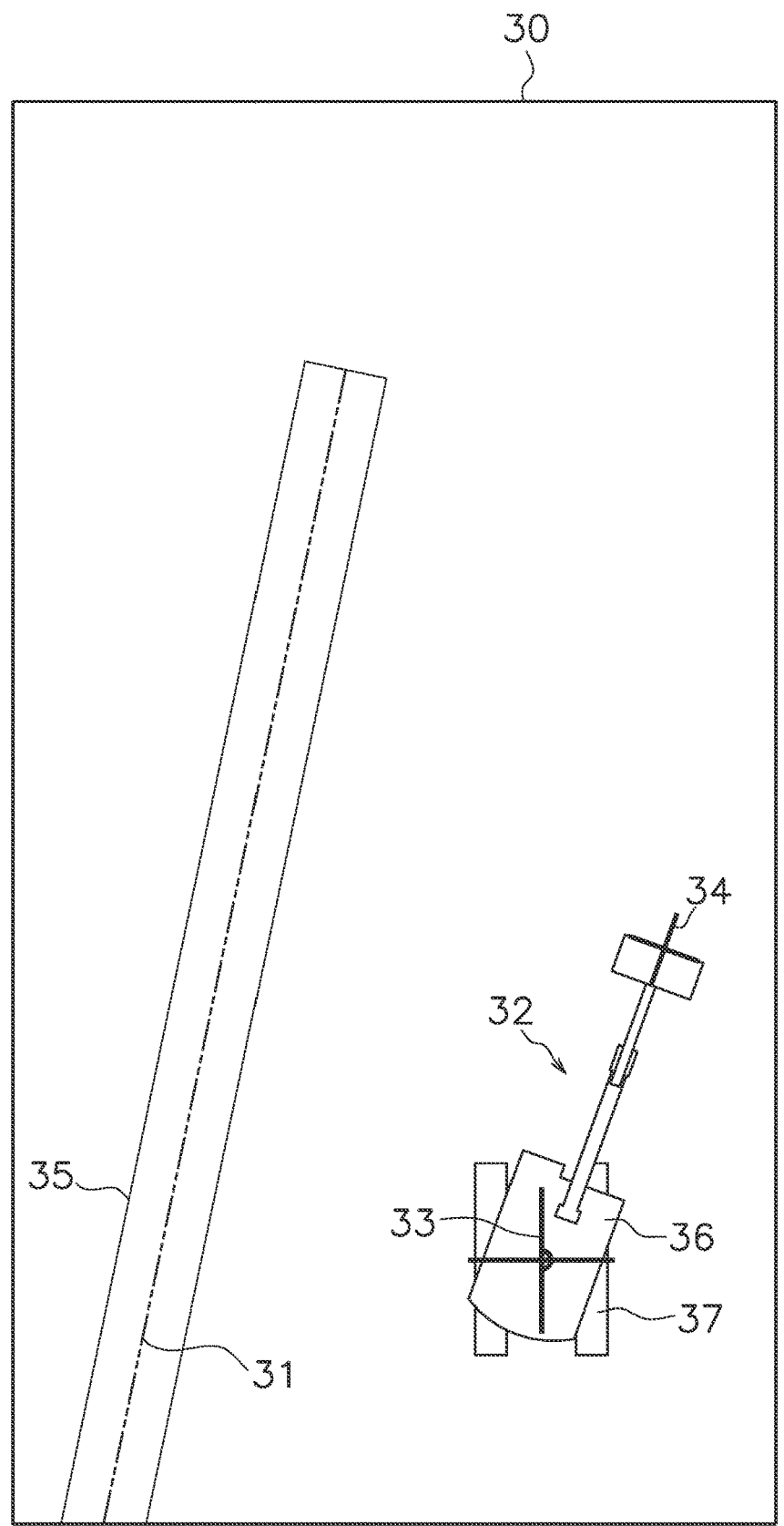
FIG. 4 illustrates an example of a guide screen.

The control of the display 21 by the controller 20 will be explained next. The controller 20 causes the display 21 to display a guide screen 30 for assisting work by the work machine 1. FIG. 4 illustrates an example of the guide screen 30. The guide screen 30 is represented as a top view that depicts the work machine 1 and a work site 200 that surrounds the work machine 1. The guide screen 30 includes a guideline 31, a machine image 32, a first guide image 33, and a second guide image 34.

Figure 5:
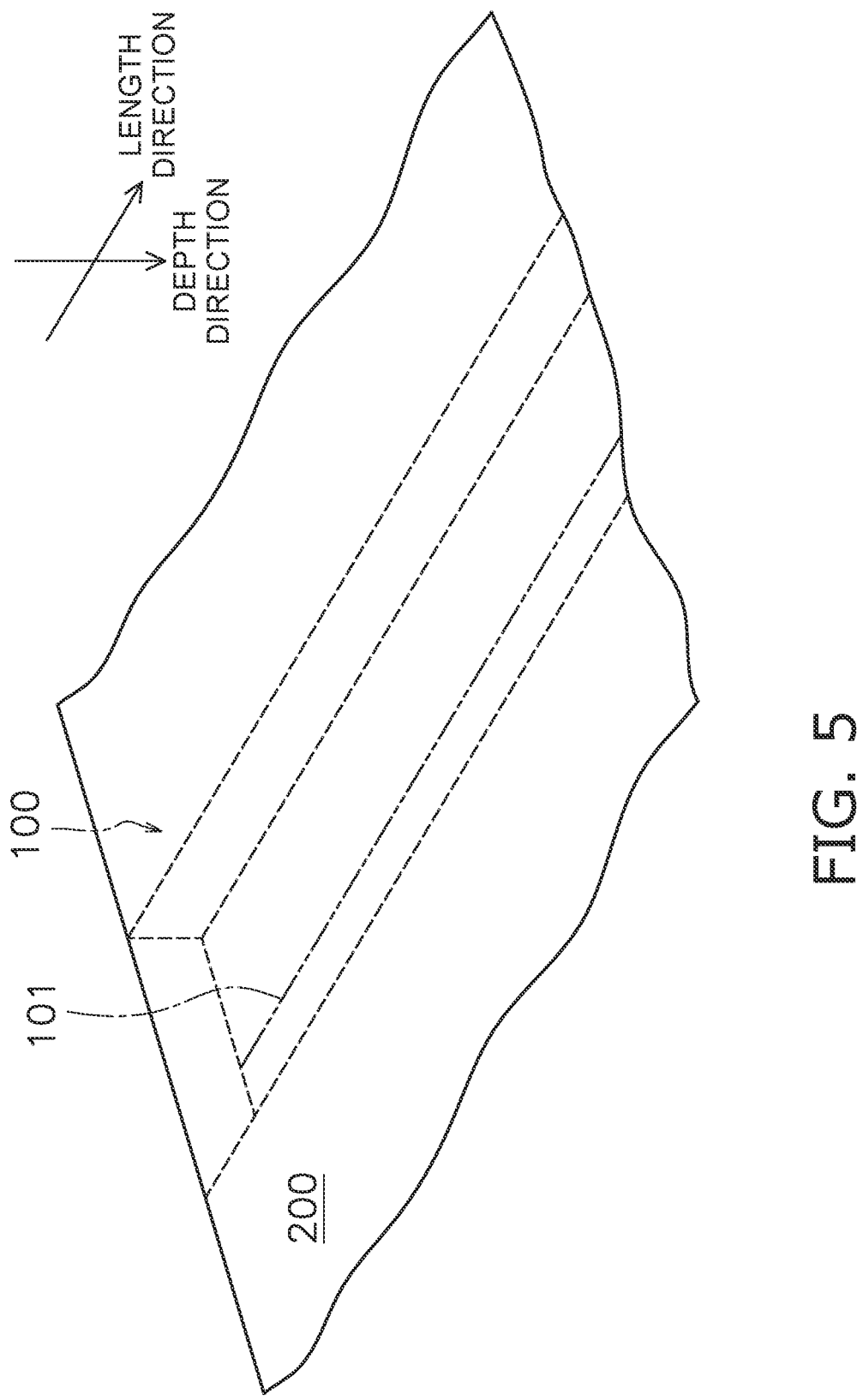
FIG. 5 illustrates an example of a design topography.

The guideline 31 indicates a target position of work to be performed by the work machine 1. As illustrated in FIG. 5, the work machine 1 performs work for forming a design topography 100 at the work site 200. In the present embodiment, the design topography 100 has the shape of a trench. The work machine 1 excavates the ground surface and forms the trench-shaped design topography 100 in the work site 200. The guideline 31 corresponds to a center line 101 of the trench that is the target.

The controller 20 acquires target position data that indicates the position of the guideline 31. The target position data includes coordinates of a plurality of points on the center line 101 of the trench. The controller 20 displays the guideline 31 on the guide screen 30 based on the target position data.

For example, the controller 20 acquires design data. The design data includes the heights and coordinates of the plurality of points that indicate the shape of the design topography 100. The controller 20 calculates the position of the center line 101 of the trench from the design data and acquires said position as target position data. Alternatively, the controller 20 may acquire the target position data from an external computer or by means of an operation signal from the input device 23.

As illustrated in FIG. 4, the controller 20 may also display a design topography line 35 that indicates the shape of the design topography 100 on the guide screen 30. The controller 20 may acquire the position of the design topography line 35 from the design data. In FIG. 4, the left and right edges of the trench-shaped design topography 100 are displayed on the guide screen 30 as the design topography line 35.

The machine image 32 indicates the position and orientation of the work machine 1. As illustrated in FIG. 4, the machine image 32 is displayed as an icon having the shape of the work machine 1. The machine image 32 includes a revolving body image 36 and an undercarriage image 37. The revolving body image 36 has the shapes of the revolving body 5 and the work implement 3. The revolving body image 36 indicates the position and direction of the revolving body 5. The undercarriage image 37 has the shape of the undercarriage 4. The undercarriage image 37 indicates the position and direction of the undercarriage 4.

As illustrated in FIG. 4, when the revolving body 5 has revolved with respect to the undercarriage 4, the controller 20 displays a state in which the revolving body image 36 has revolved with respect to the undercarriage image 37 on the guide screen 30. That is, the controller 20 displays the revolving body image 36 with an orientation different from that of the undercarriage image 37.

The first guide image 33 indicates the position of the work machine 1. The first guide image 33 is displayed superimposed on the machine image 32. Specifically, the first guide image 33 indicates the position of the revolving axis 8. The controller 20 displays the first guide image 33 in a position on the guide screen 30 that corresponds to the position of the revolving axis 8. The first guide image 33 is explained in detail below.

The second guide image 34 indicates the position of the work point P1. The second guide image 34 is displayed on the work point of the machine image 32. The controller 20 displays the second guide image 34 in a position on the guide screen 30 that corresponds to the position of the work point P1. The second guide image 34 is represented, for example, as crossed lines. However, the second guide image 34 may be another shape such as a point, a circle, or a polygon.

Figure 6:
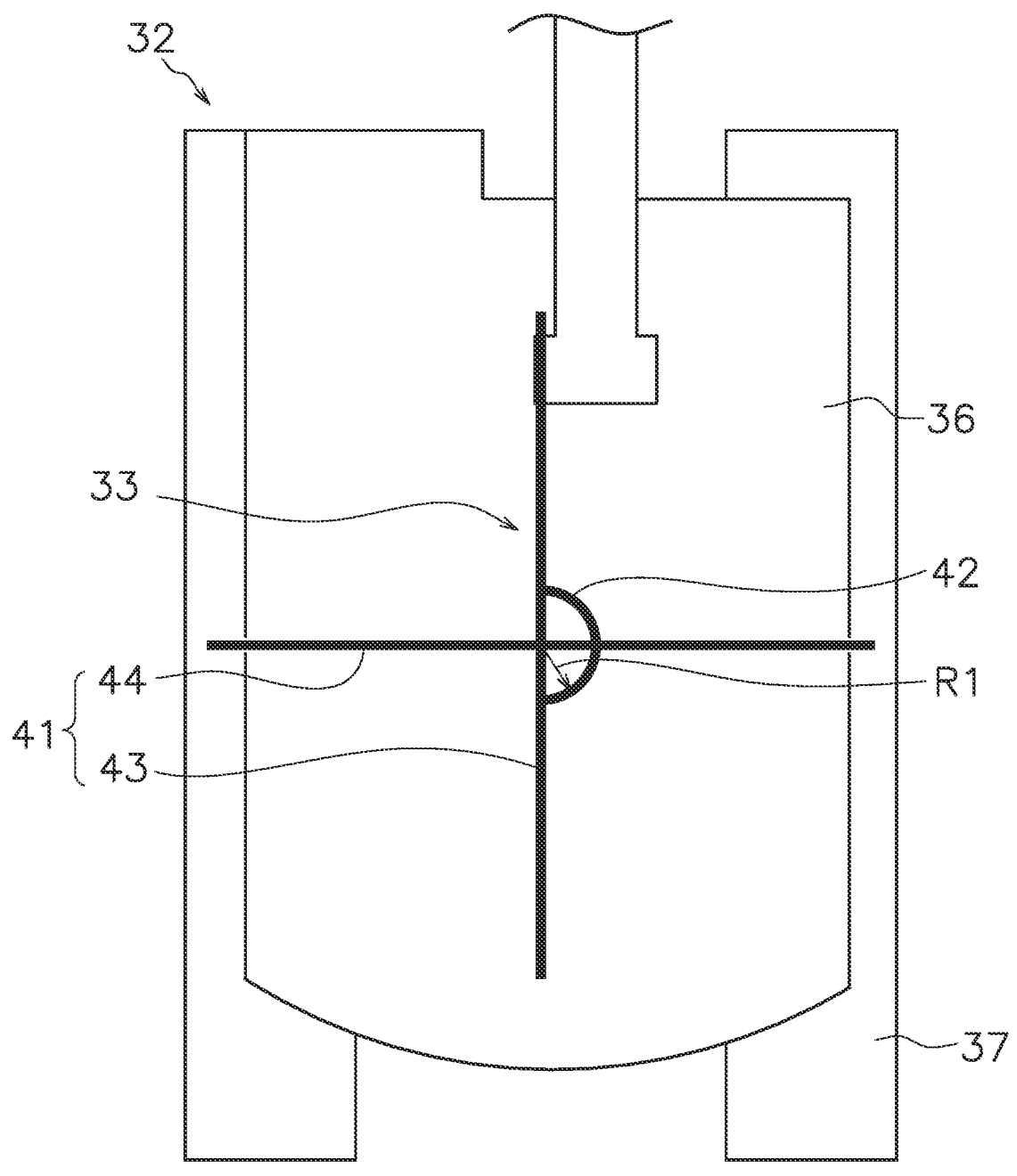
FIG. 6 is an enlargement of the guide image.

FIG. 6 is an enlargement of the machine image 32 and the first guide image 33. As illustrated in FIG. 6, the first guide image 33 includes a first image 41 and a second image 42. The first image 41 indicates the position of the revolving axis 8. The first image 41 has the shape of crossed lines. Specifically, the first image 41 includes a first straight line 43 and a second straight line 44. The first straight line 43 passes through the position of the revolving axis 8 and is displayed parallel to the front-back direction of the undercarriage 4. The first straight line 43 extends in the front-back direction of the undercarriage 4.

The second straight line 44 perpendicularly crosses the first straight line 43 at the position of the revolving axis 8. The intersection of the first straight line 43 and the second straight line 44 indicates the position of the revolving axis 8. The second straight line 44 extends in the left-right direction of the undercarriage 4. As illustrated in FIG. 4, the controller 20 displays the first guide image 33 in accordance with the orientation of the undercarriage 4 when the orientation of the undercarriage 4 and the orientation of the work implement 3 are different.

The second image 42 indicates a position spaced away from the revolving axis 8 by the separation distance D1. The second image 42 includes an arc that has a radius R1 corresponding to the separation distance D1 and centered on the position corresponding to the revolving axis 8. At least a portion of the arc is disposed on the work point P1 side with respect to the first image 41 in the width direction of the revolving body 5. In other words, at least a portion of the arc is disposed on a working plane A1 side with respect to the first image 41.

A method for working performed by the work machine 1 in reference to the guide screen 30 will be explained next. Firstly, the work machine 1 is considered to be positioned away from the design topography 100 in the work site 200. In this case, the machine image 32 is spaced away from the guideline 31 on the guide screen 30 as illustrated in FIG. 4.

Figure 7:
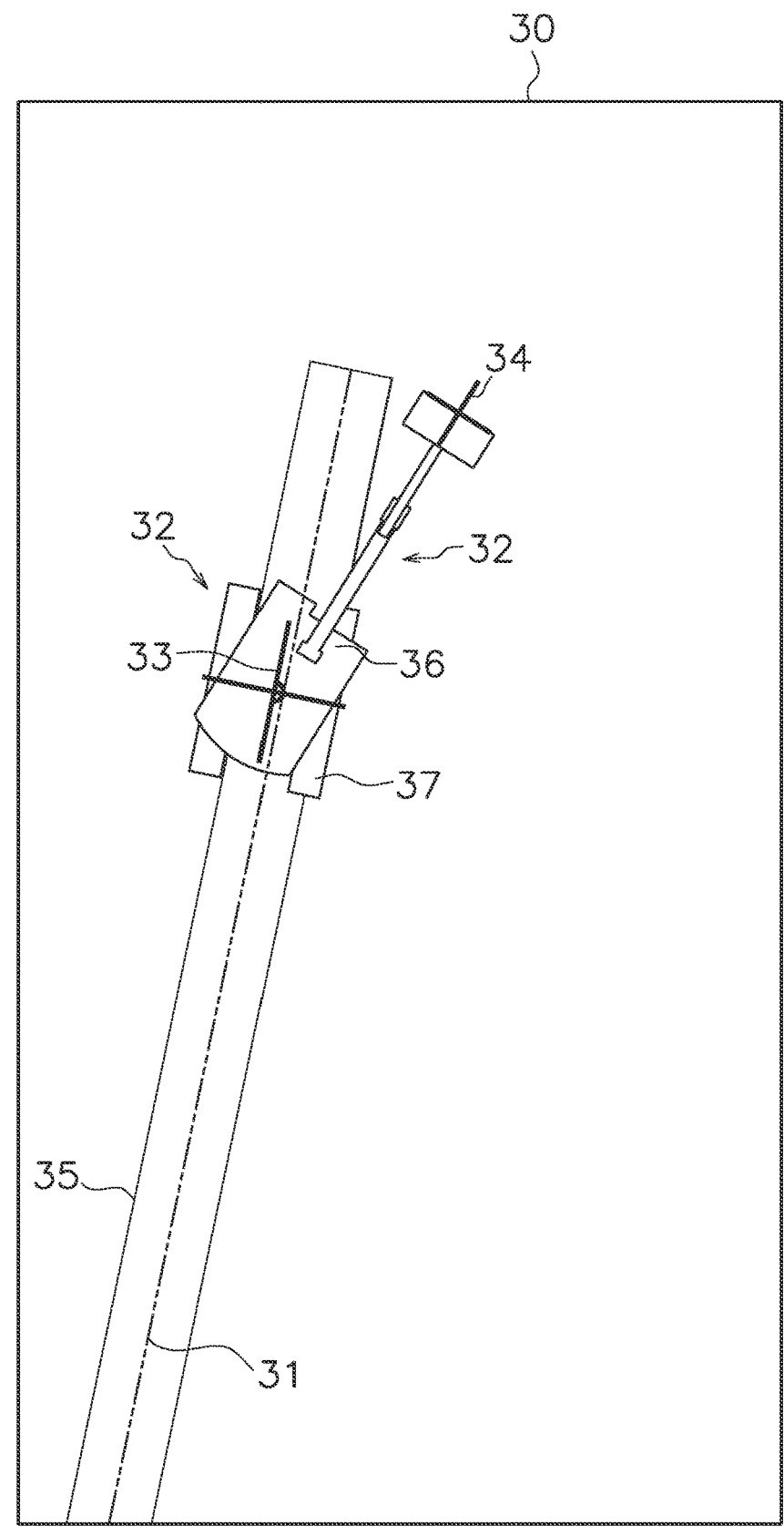
FIG. 7 illustrates a method for working while referring to the guide screen.
Figure 8:
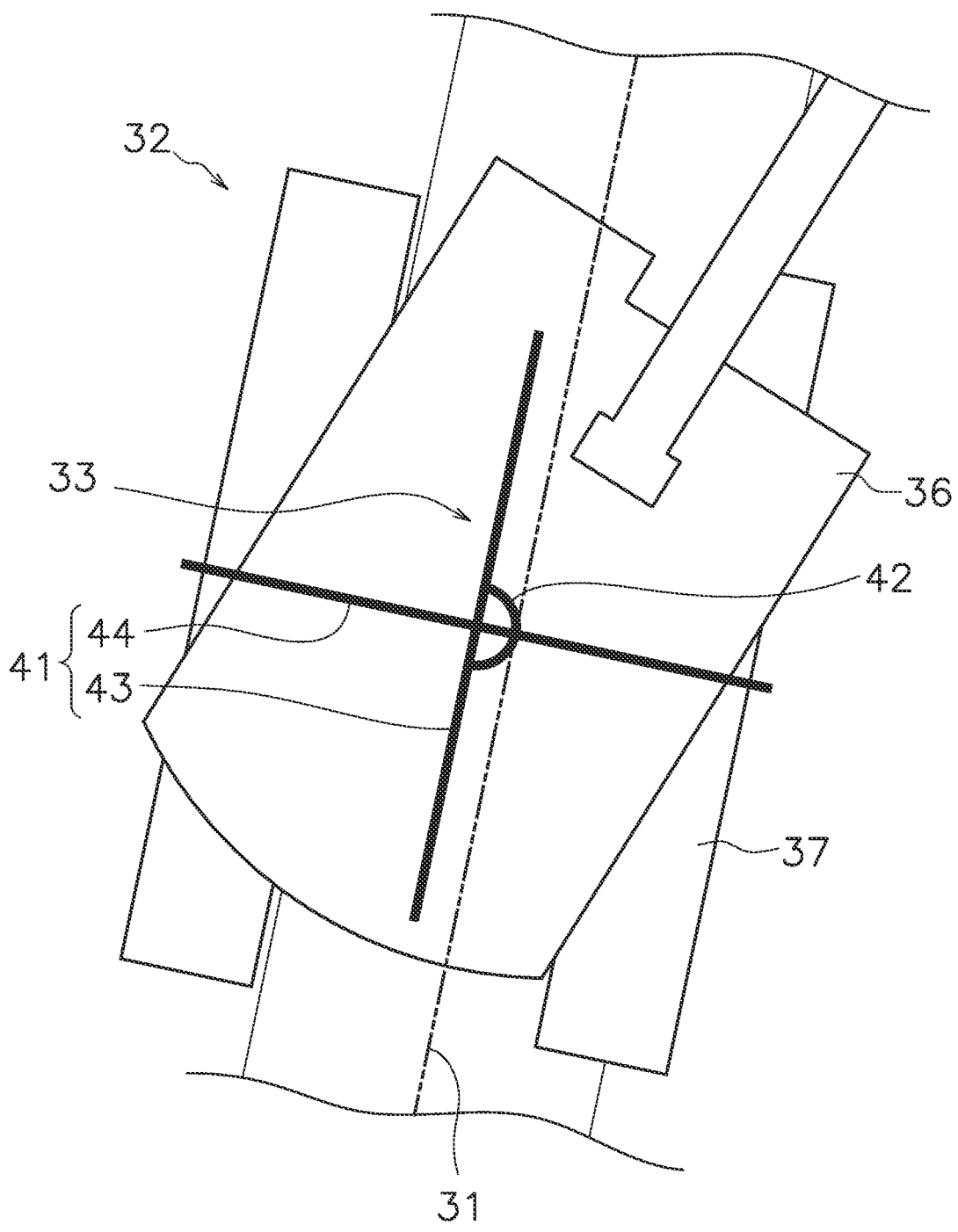
FIG. 8 is an enlargement of FIG. 7.

As illustrated in FIG. 7, the operator moves the work machine 1 so as to approach the guideline 31. FIG. 8 is an enlargement of FIG. 7. As illustrated in FIG. 8, the operator moves the work machine 1 so that the first straight line 43 of the first image 41 is approximately parallel to the guideline 31 and the second image 42 coincides with the guideline 31. That is, the operator moves the work machine 1 so that the first straight line 43 of the first image 41 is approximately parallel to the guideline 31 and the arc of the second image 42 abuts the guideline 31.

Figure 9:
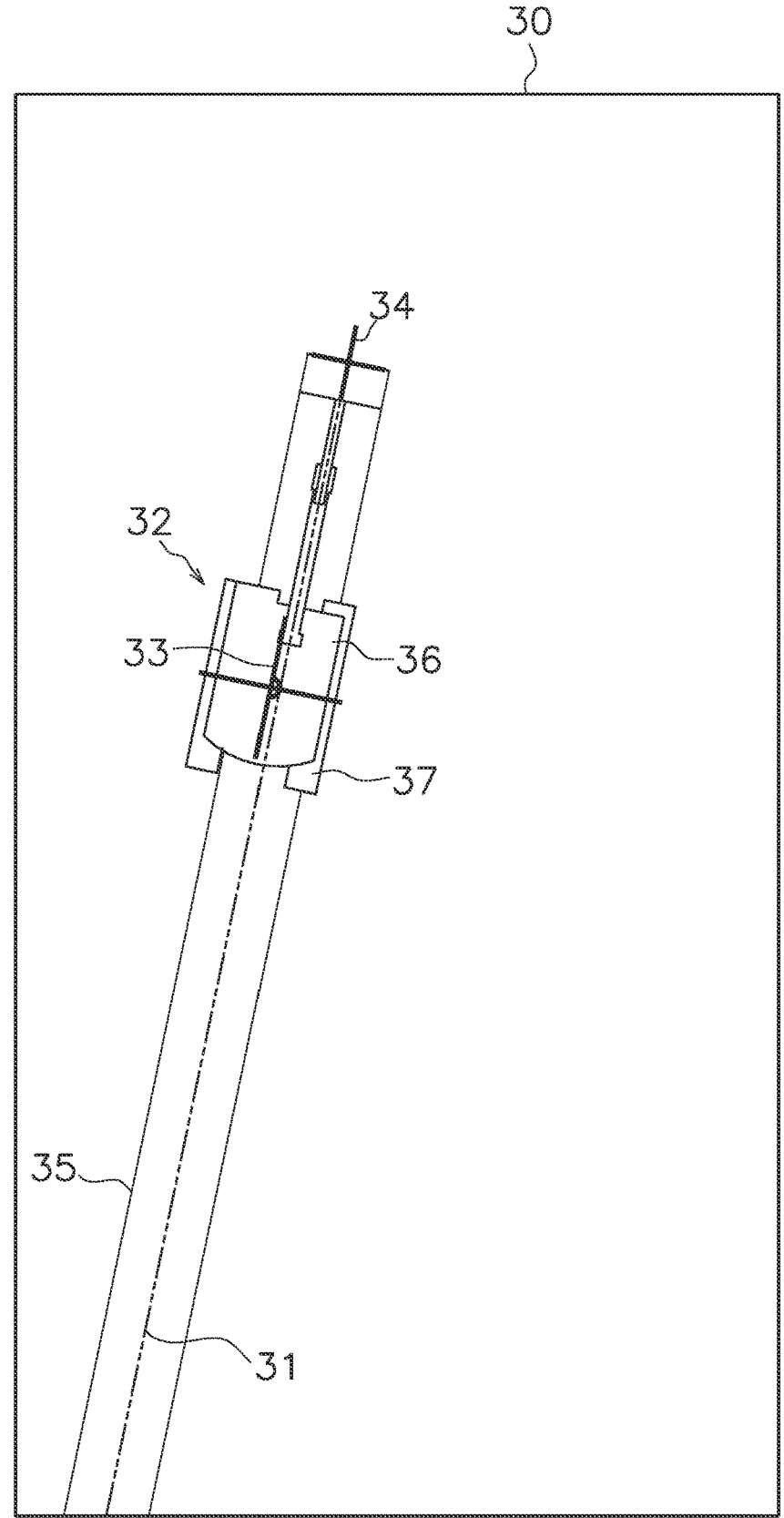
FIG. 9 illustrates a method for working while referring to the guide screen.

Next as illustrated in FIG. 9, the operator causes the revolving body 5 to revolve so that the second guide image 34 coincides with the guideline 31. Consequently, the working plane A1 of the work machine 1 coincides with the center line 101 of the design topography 100 and the work implement 3 is positioned with the design topography 100. In this state, the operator lowers the work tool 13 and excavates the ground surface.

Figure 10:
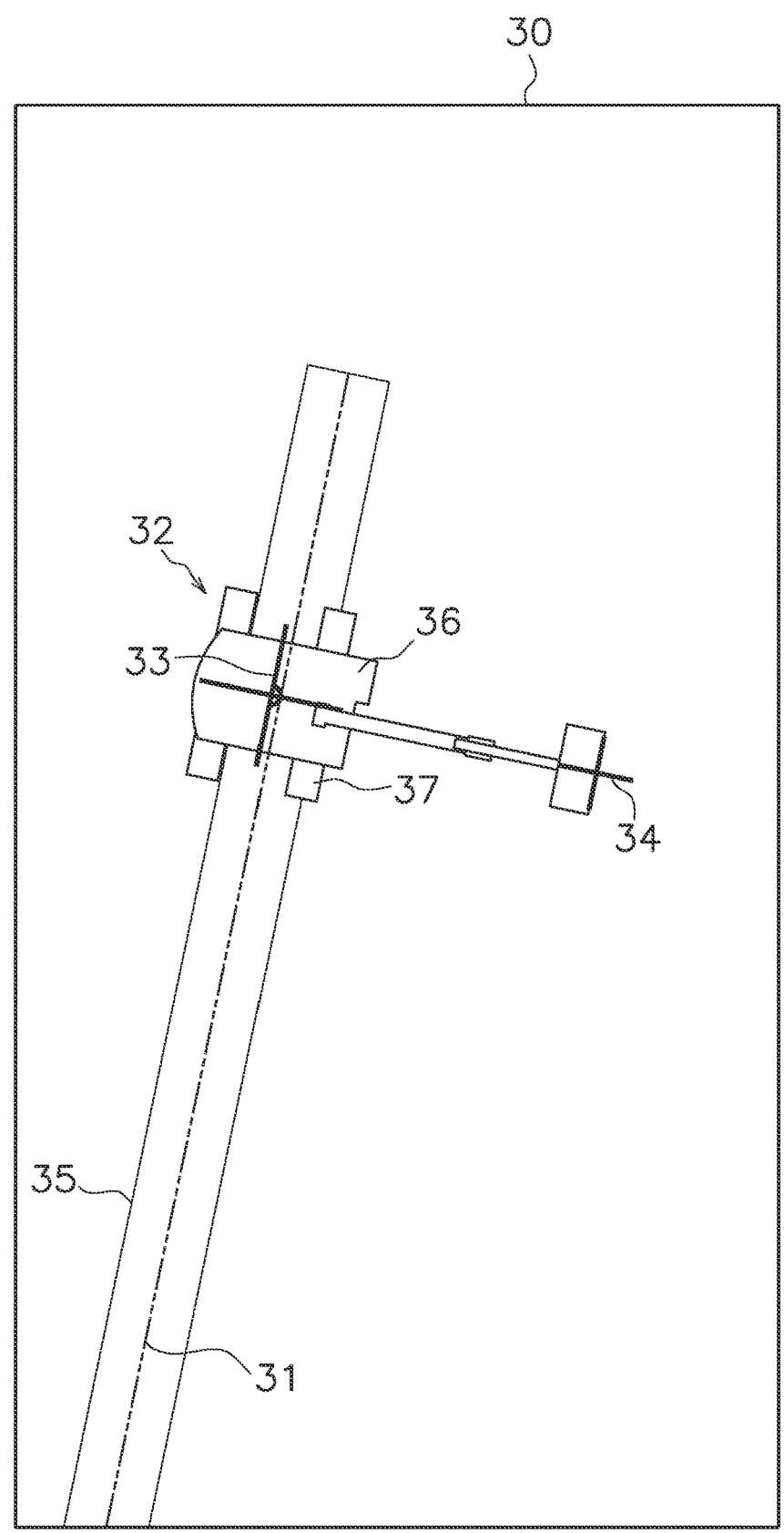
FIG. 10 illustrates a method for working while referring to the guide screen.
Figure 11:
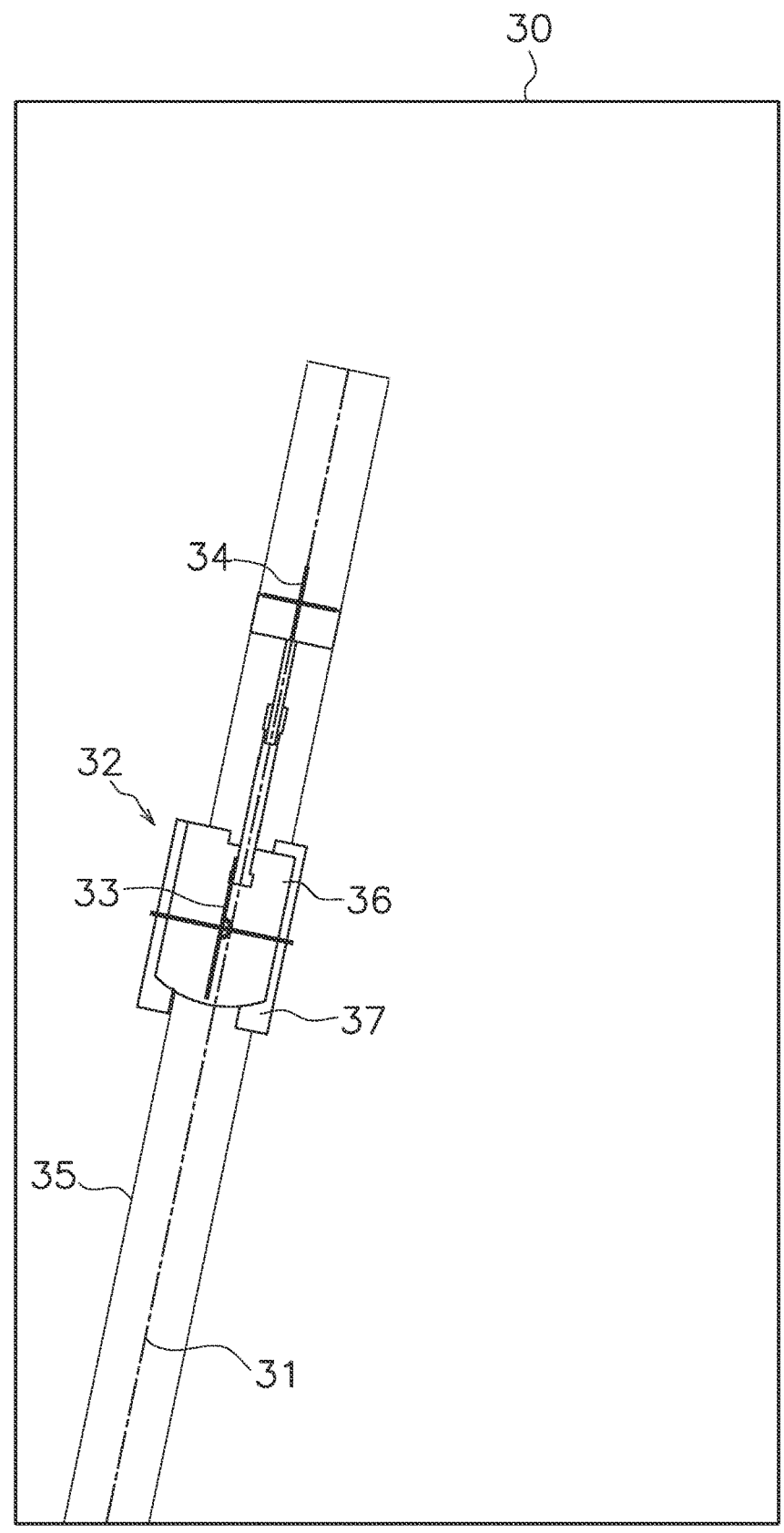
FIG. 11 illustrates a method for working while referring to the guide screen.

After excavation, the operator raises the work tool 13 and causes the revolving body 5 to revolve as illustrated in FIG. 10. The operator then unloads the excavated soil from the work tool 13. The operator then once again causes the revolving body 5 to revolve so that the second guide image 34 coincides with the guideline 31. The above operations are repeated thereafter. When the trench has been excavated up to the depth prescribed in the design topography data, the operator causes the work machine 1 to retreat along the guideline 31 as illustrated in FIG. 11. The operations are repeated until the trench having the depth and length prescribed in the design topography data is complete.

According to the control system of the work machine 1 of the present embodiment explained so far, the operator of the work machine 1 refers to the first image 41 and the second image 42 on the display 21 and thereby is able to easily understand the positional relationship with the working plane A1 that passes through the revolving axis 8 and the work point P1. As a result, an operation for positioning the work implement 3 and the target position is facilitated even in the work machine 1 in which the work point P1 is disposed away from the revolving axis 8 in the width direction of the revolving body 5.

Although an embodiment of the present disclosure has been described so far, the present disclosure is not limited to the above embodiment and various modifications may be made within the scope of the disclosure.

The work machine 1 is not limited to the above-mentioned hydraulic excavator and may be another type of excavator, such as an electric shovel. The number of rotating shafts of the work implement 3 is not limited to three and may be less than three or more than three. The work tool 13 is not limited to a bucket and may be another work tool, such as a breaker, a compactor, or a blade. In this case, the work point P1 may be positioned on a portion of the work tool 13 that comes into contact with the work target such as the ground surface. The work point P1 may be positioned at a position different from the center of the blade tip of the bucket.

The work machine 1 may be a vehicle that can be remotely operated. In this case, a portion of the control system of the work machine 1 may be disposed outside of the work machine 1. For example, the controller 20 may be disposed outside the work machine 1. The controller 20 may control the work machine 1 by wireless communication. The display 21, the operating device, 22 and the input device 23 may also be disposed outside of the work machine 1. The operating cabin 6 may be omitted.

The controller 20 may include a plurality of controllers separate from each other. The above-mentioned processing of the controller 20 may distributed and executed among the plurality of controllers. The controller 20 may include a plurality of processors. The above-mentioned process by the controller 20 may distributed and executed among the plurality of processors.

The processing by the controller 20 is not limited to that of the above embodiment and may be changed. A portion of the above-mentioned processing may be omitted. A portion of the above-mentioned processing may be changed. The guide screen 30 is not limited to the above embodiment and may be changed. For example, the guide screen 30 may be a perspective view.

Figure 12:
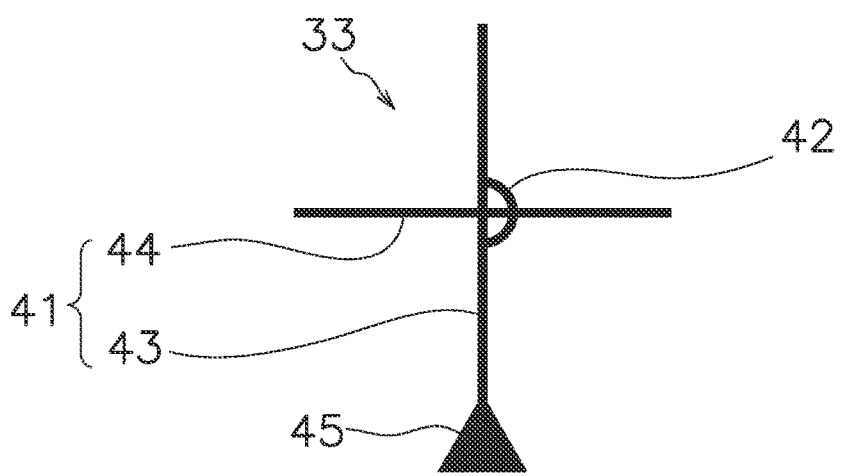
FIG. 12 illustrates a first guide image according to a first modified example.

The first guide image 33 is not limited to the above embodiment and may be changed. For example, FIG. 12 illustrates the first guide image 33 according to a first modified example. As illustrated in FIG. 12, the first guide image 33 further includes a third image 45. The third image 45 indicates the orientation of the undercarriage 4. That is, the third image 45 indicates the forward direction of the undercarriage 4. The third image 45 may have a tapered shape and may be displayed on the guide screen 30 so as to designate the orientation of the undercarriage 4. The third image 45 may be, for example, a triangle and may be connected to the rear end of the first straight line 43.

Figure 13:
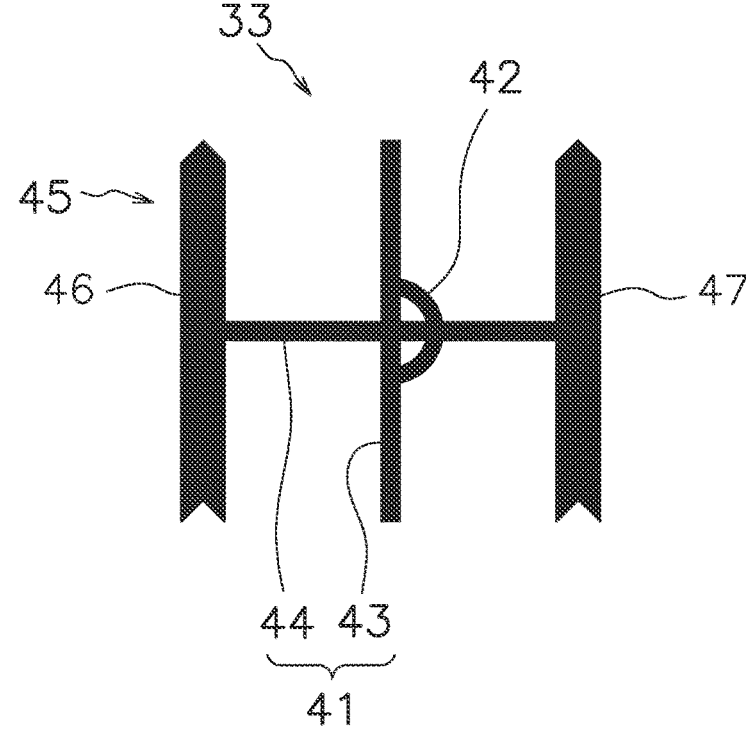
FIG. 13 illustrates the first guide image according to a second modified example.

FIG. 13 illustrates the first guide image 33 according to a second modified example. As illustrated in FIG. 13, the third image 45 may include a third straight line 46 and a fourth straight line 47. The third straight line 46 and the fourth straight line 47 may be respectively connected to the left and right ends of the second straight line 44. The third straight line 46 and the fourth straight line 47 may extend in the front-back direction of the undercarriage 4. The third straight line 46 and the fourth straight line 47 may each have tip end that has a tapered shape and may be displayed on the guide screen 30 so as to indicate the orientation of the undercarriage 4.

Figure 14A:
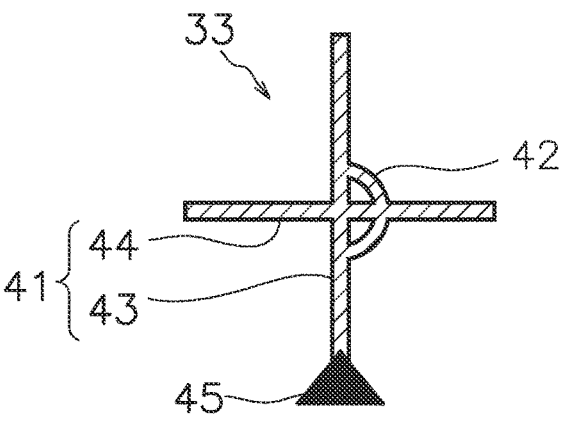
FIG. 14A illustrates a highlighted display of the first guide image according to the first modified example.

The controller 20 may display the first guide image 33 in a highlighted manner in accordance with the positional relationship of the work machine 1 and the design topography 100. When a predetermined positional relationship between the second image 42 and the guideline 31 is satisfied, the first guide image 33 may be displayed in a highlighted manner. For example, when the arc of the second image 42 abuts the guideline 31, the first guide image 33 may be displayed in a highlighted manner. In this case, during normal operation, the first guide image 33 according to the first modified example illustrated in FIG. 12 may be displayed on the guide screen 30. When the second image 42 and the guideline 31 coincide, for example, the first image 41 and the second image 42 may be displayed in different colors than during normal operation as illustrated in FIG. 14A. In the drawings, the different colors are represented by different types of shading.

Figure 14B:
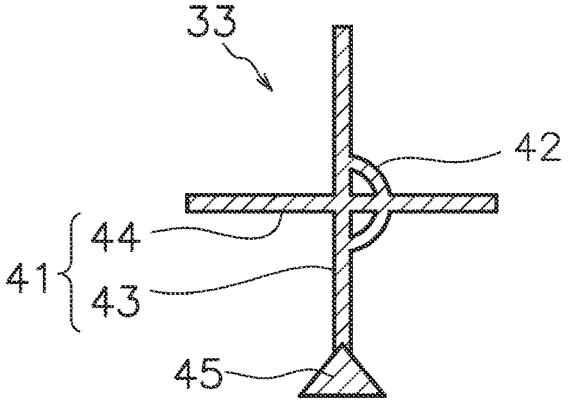
FIG. 14B illustrates a highlighted display of the first guide image according to the first modified example.

The controller 20 may also display the third image 45 in a highlighted manner when the front-back direction of the undercarriage 4 is parallel to the guideline 31. For example, as illustrated in FIG. 14B, the first image 41, the second image 42, and the third image 45 may be displayed in different colors than during normal operation.

Figure 14C:
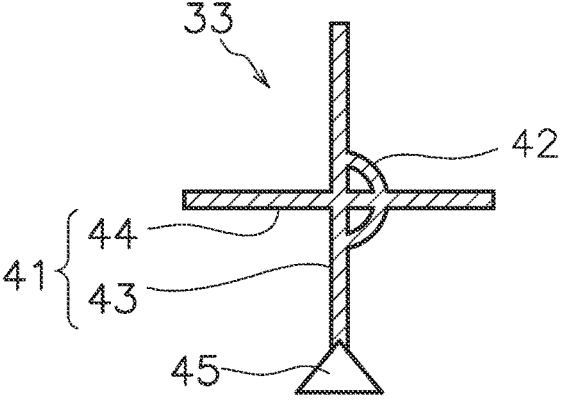
FIG. 14C illustrates a highlighted display of the first guide image according to the first modified example.

The controller 20 may start an automatic control of the work machine 1 when a starting condition for automatic control is satisfied. The starting condition may include the second image 42 coinciding with the guideline 31 and the front-back direction of the undercarriage 4 being parallel to the guideline 31. In the automatic control, the controller 20 may assist the traveling of the work machine 1 so that the position of the work machine 1 does not deviate from the guideline 31 during the traveling operation of the work machine 1 by the operator. During the automatic control, the controller 20 may also display the first guide image 33 in a highlighted manner. For example, as illustrated in FIG. 14C, the third image 45 may be displayed with a different color than the first and second images 41 and 42.

Figure 15A:
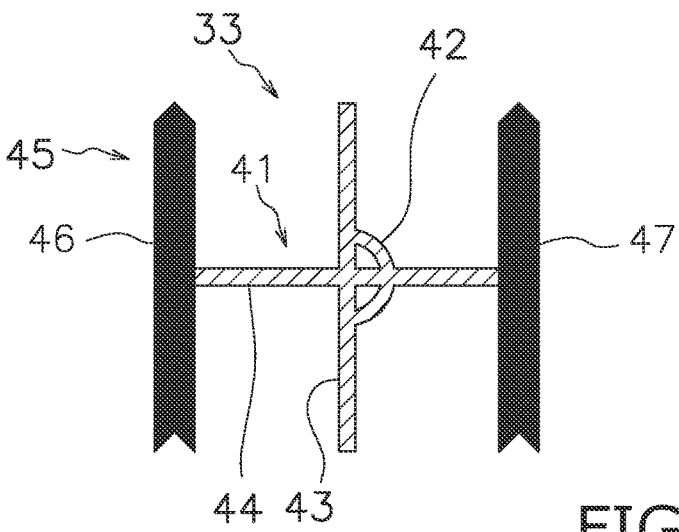
FIG. 15A illustrates a highlighted display of the first guide image according to the second modified example.
Figure 15B:
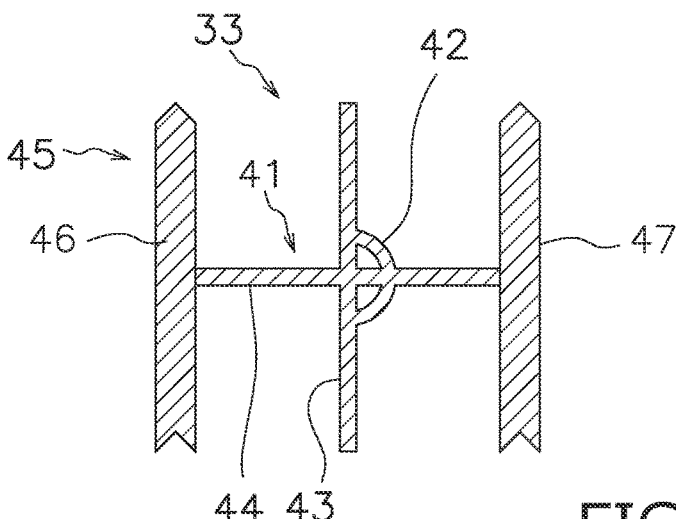
FIG. 15B illustrates a highlighted display of the first guide image according to the second modified example.
Figure 15C:
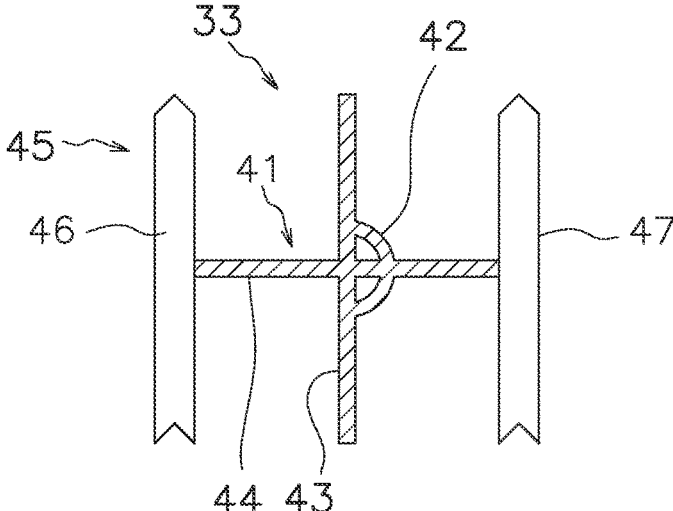
FIG. 15C illustrates a highlighted display of the first guide image according to the second modified example.

The first guide image 33 according to a second modified example may also be displayed in a highlighted manner in accordance with the positional relationship of the work machine 1 and the design topography 100 in the same way as the first guide image 33 according to the first modified example. For example, when the second image 42 and the guideline 31 coincide, the first image 41 and the second image 42 may be displayed in different colors than during normal operation as illustrated in FIG. 15A. For example, when the front-back direction of the undercarriage 4 has become parallel to the guideline 31, as illustrated in FIG. 15B, the first image 41, the second image 42, and the third image 45 may be displayed in different colors than during normal operation. During automatic control, as illustrated in FIG. 15C, the third image 45 may be displayed with a different color than the first and second images 41 and 42. The displaying in a highlighted manner is not limited to different colors and may be displayed with a different method such as blinking.

Figure 16A:
FIG. 16A illustrates the first guide image according to another modified example.
Figure 16B:
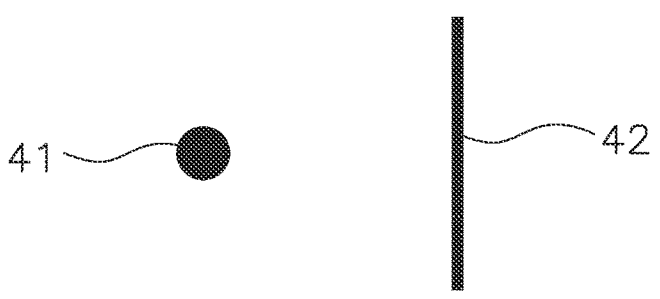
FIG. 16B illustrates the first guide image according to another modified example.

The first image 41 is not limited to crossed lines and may have another shape. The second image 42 is not limited to an arc and may have another shape. For example, FIGS. 16A-16D, 17A, and 17B illustrate the first guide image 33 according to other modified examples. As illustrated in FIG. 16A, the first image 41 and the second image 42 may both be points. As illustrated in FIG. 16B, the first image 41 may be a point and the second image 42 may be a straight line that extends in the front-back direction.

Figure 16C:
FIG. 16C illustrates the first guide image according to another modified example.
Figure 16D:
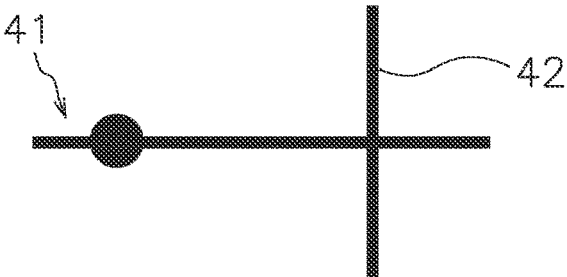
FIG. 16D illustrates the first guide image according to another modified example.

As illustrated in FIG. 16C, the first image 41 may be a combination of a point and a straight line that extends in the left-right direction, and the second image 42 may be a point. As illustrated in FIG. 16D, the first image 41 may be a combination of a point and a straight line that extends in the left-right direction, and the second image 42 may be a straight line that extends in the front-back direction.

Figure 17A:
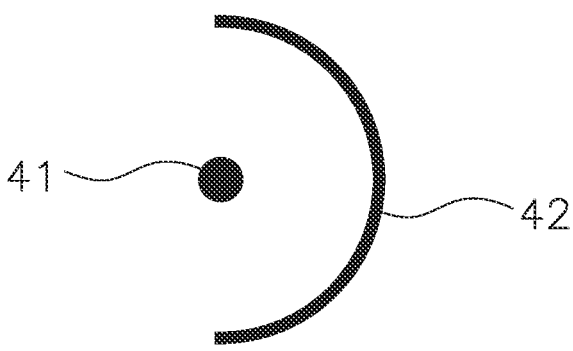
FIG. 17A illustrates the first guide image according to another modified example.
Figure 17B:
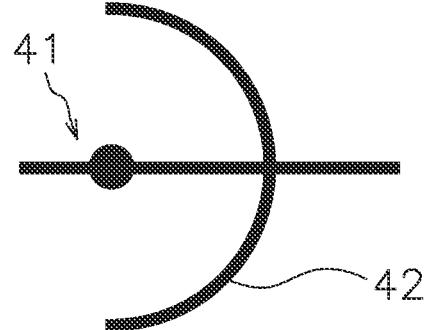
FIG. 17B illustrates the first guide image according to another modified example.
Figure 18A:
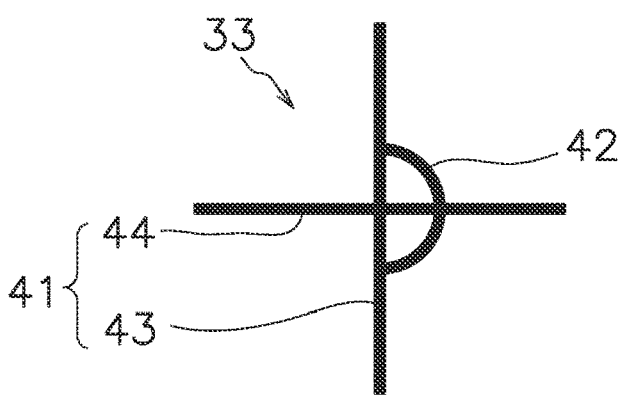
FIG. 18A illustrates the first guide image that is enlarged or reduced.
Figure 18B:
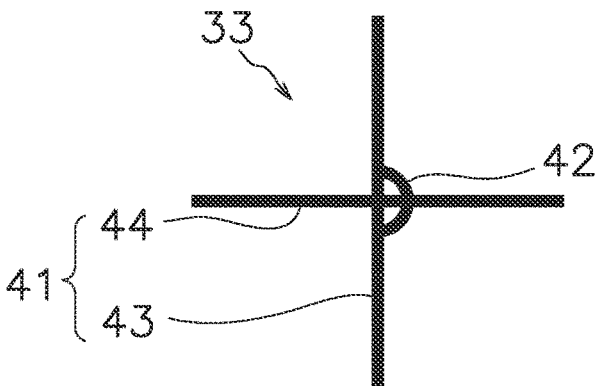
FIG. 18B illustrates the first guide image that is enlarged or reduced.
Figure 18C:
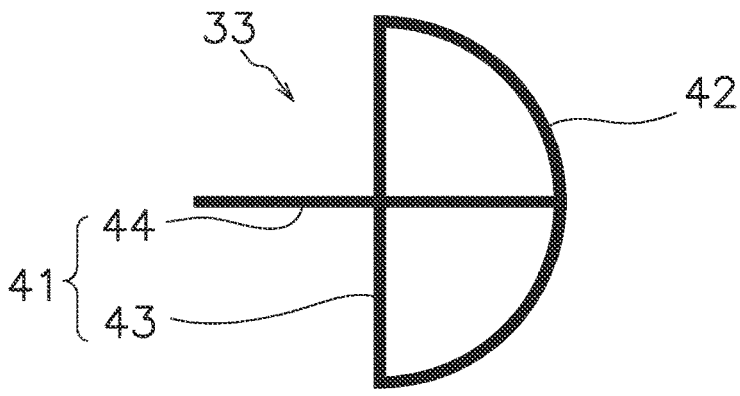
FIG. 18C illustrates the first guide image that is enlarged or reduced.

As illustrated in FIG. 17A, the first image 41 may be a point and the second image 42 may be an arc. As illustrated in FIG. 17B, the first image 41 may be a combination of a point and a straight line that extends in the left-right direction, and the second image 42 may be an arc.

The size of the second image 42 may be changeable. For example, the controller 20 may enlarge or reduce the guide screen 30 in accordance with an operation of the input device 23 by the operator. The controller 20 may enlarge or reduce the second image 42 in accordance with the enlargement or reduction of the guide screen 30. That is, the controller 20 may enlarge or reduce the second image 42 in accordance with the enlargement or reduction of the machine image 32. In this case, as illustrated in FIGS.

18A-18C, the size of the first image 41 is not changed and only the second image 42 is enlarged or reduced.

According to the present disclosure, it is possible to facilitate an operation for positioning the work implement of the work machine and the target position.

The invention claimed is:

1. A display system for a work machine including an undercarriage, a revolving body that is supported on the undercarriage so as to allow revolving about a revolving axis, and a work implement connected to the revolving body, the work implement including a boom, an arm and a work tool, the boom being rotatably attached to the revolving body, the arm being rotatably attached to the boom, the work tool being rotatably attached to the arm, the display system comprising:
   a display; and
   a controller communicably connected to the display, the controller being configured to
      acquire machine position data indicative of a position of the work machine,
      acquire a separation distance in a width direction of the revolving body between a work point of the work implement that is disposed spaced away from the revolving axis in the width direction and the revolving axis, the work point being disposed at an end of the work tool of the work implement,
      acquire target position data indicative of a target position of the work implement, and
      cause the display to display a guide screen including a guideline indicative of the target position and a guide image indicative of the position of the work machine based on the machine position data and the target position data,
      the guide image including
         a first image indicative of a position of the revolving axis, and
         a second image indicative of a position spaced away from the revolving axis by the separation distance.

2. The display system according to claim 1, wherein the second image includes an arc that is centered on the position of the revolving axis and has a radius corresponding to the separation distance.

3. The display system according to claim 1, wherein the first image includes
   a first straight line that passes through the revolving axis and is parallel to a front-back direction of the undercarriage, and
   a second straight line that intersects the first straight line at the revolving axis.

4. The display system according to claim 1, wherein the controller is further configured to display the guide image in a highlighted manner when the second image satisfies a predetermined positional relationship with the guideline.

5. The display system according to claim 1, wherein the guide image further includes a third image indicative of an orientation of the undercarriage.

6. The display system according to claim 5, wherein the controller is further configured to display the third image in a highlighted manner when the front-back direction of the undercarriage is parallel to the guideline.

7. The display system according to claim 1, wherein the controller is further configured to display the guide image in accordance with the orientation of the undercarriage when the orientation of the undercarriage and an orientation of the work implement are different.

8. The display system according to claim 1, wherein the controller is further configured to start an automatic control of the work machine when a starting condition of the automatic control is satisfied, and
   the starting condition includes the second image coinciding with the guideline and the front-back direction of the undercarriage being parallel to the guideline.

9. The display system according to claim 8, wherein the controller is further configured to display the guide image in a highlighted manner during the automatic control.

10. The display system according to claim 1, further comprising
   an operating member configured to be operable by an operator,
   the controller is further configured to
      enlarge or reduce the guide screen in accordance with an operation of the operating member, and
      enlarge or reduce the second image in accordance with an enlargement or reduction of the guide screen.

11. The display system according to claim 10, wherein the controller is further configured to enlarge or reduce only the second image with respect to the first image in accordance with the enlargement or reduction of the guide screen.

12. The display system according to claim 1, wherein the second image of the guide image is displayed on the revolving body.

13. The display system according to claim 1, wherein the guide image is displayed in accordance with an orientation of the undercarriage.

14. A display method for a work machine including an undercarriage, a revolving body that is supported on the undercarriage so as to allow revolving about a revolving axis, and a work implement connected to the revolving body, the work implement including a boom, an arm and a work tool, the boom being rotatably attached to the revolving body, the arm being rotatably attached to the boom, the work tool being rotatably attached to the arm, the display method comprising:
   acquiring machine position data indicative of a position of the work machine;
   acquiring a separation distance in a width direction of the revolving body between a work point of the work implement that is disposed spaced away from the revolving axis in the width direction and the revolving axis, the work point being disposed at an end of the work tool of the work implement;
   acquiring target position data indicative of a target position of the work implement;
   causing the display to display a guide screen including a guideline indicative of the target position and a guide image indicative of the position of the work machine based on the machine position data and the target position data,
   the guide image including
      a first image indicative of a position of the revolving axis, and
      a second image indicative of a position spaced away from the revolving axis by the separation distance.

15. The display method according to claim 14, wherein the guide image further includes a third image indicative of an orientation of the undercarriage.

16. The display method according to claim 14, wherein the second image includes an arc that is centered on the position of the revolving axis and has a radius corresponding to the separation distance.

17. The display method according to claim 14, wherein the first image includes a first straight line that passes through the revolving axis and is parallel to a front-back direction of the undercarriage, and a second straight line that intersects the first straight line at the revolving axis.

\* \* \* \* \*